Aug. 22, 1950     A. K. PETERSON ET AL     2,519,396
ROTARY LINE DRIER
Filed March 24, 1947     2 Sheets-Sheet 1
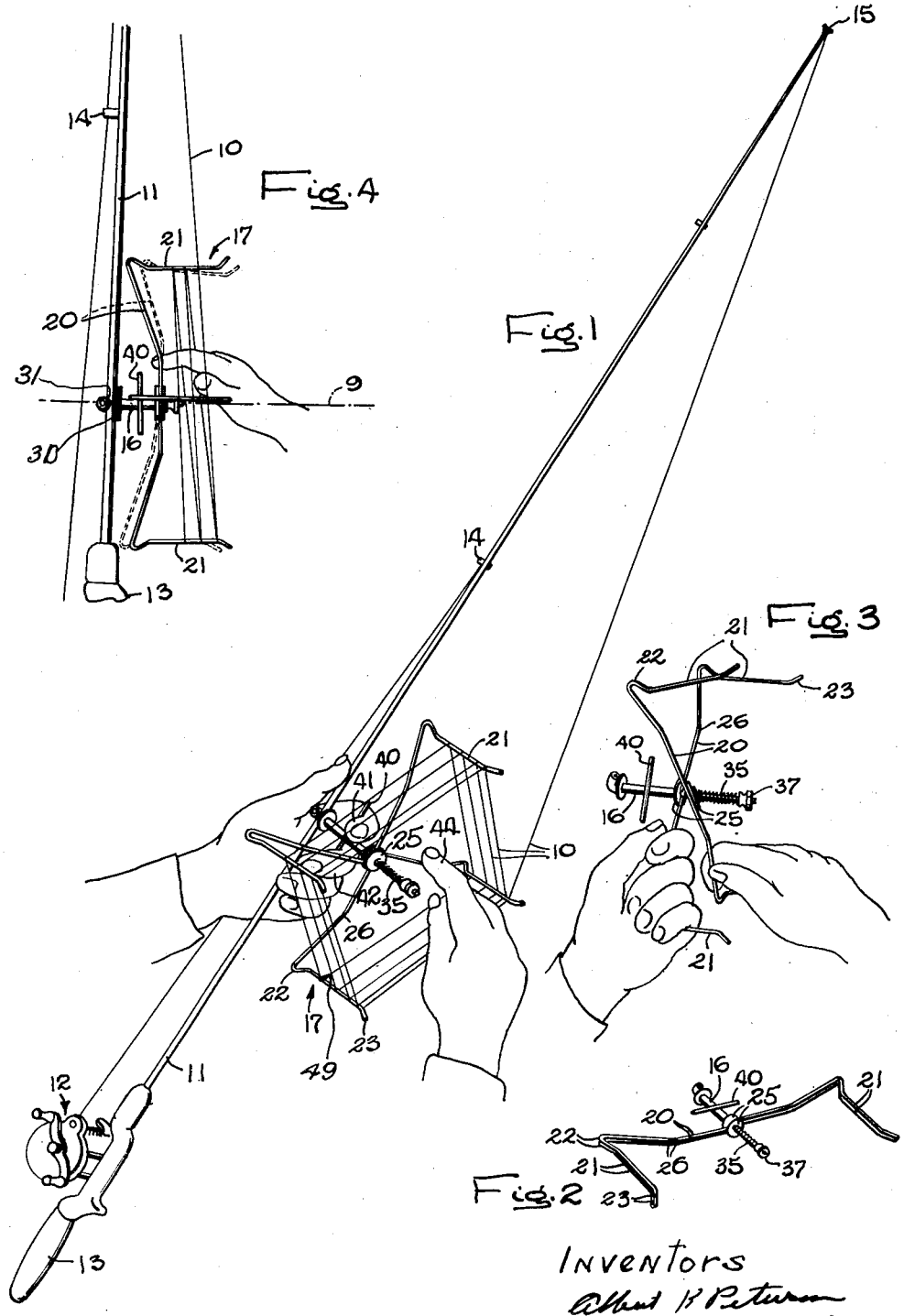

Aug. 22, 1950  A. K. PETERSON ET AL  2,519,396
ROTARY LINE DRIER
Filed March 24, 1947  2 Sheets-Sheet 2
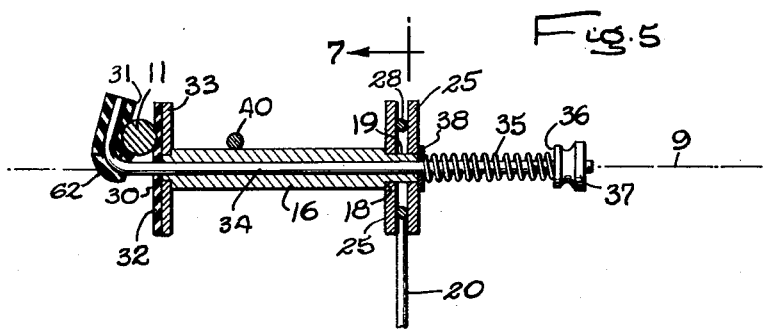
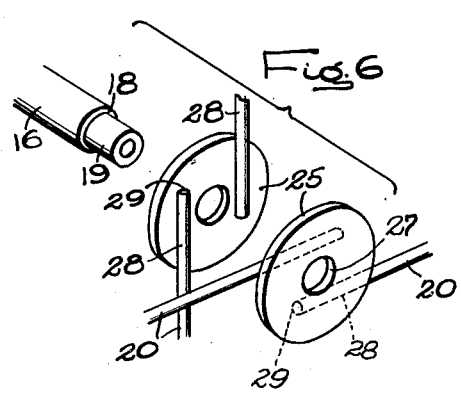
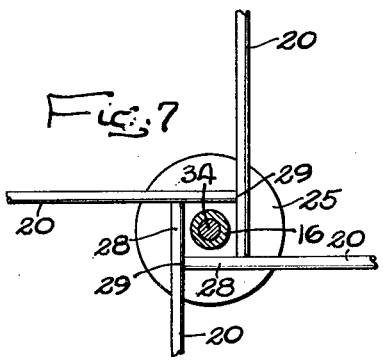
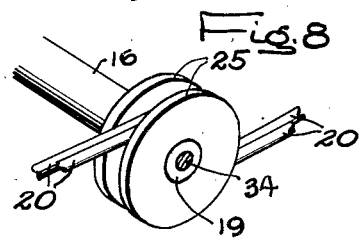
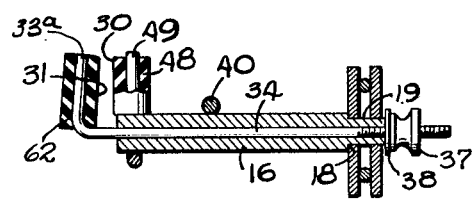
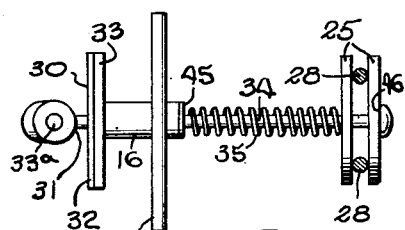
INVENTORS
Albert H Peterson
Horace C Hubbard Patented Aug. 22, 1950

2,519,396

UNITED STATES PATENT OFFICE 2,519,396

ROTARY LINE DRIER

Albert K. Peterson and Honore C. Hubbard,
Rockford, Ill.

Application March 24, 1947, Serial No. 736,830

18 Claims. (Cl. 242—104)

This invention relates to a rotary reel detachably mountable on a fishing rod and operable to lead the line off from the tip of a casting rod and wind up the line and transfer the same from the casting reel to the larger drying reel.

The general object is to provide a line drying reel of the above character which is simple and inexpensive in construction, which is collapsible into a small package, which is readily attachable to and detachable from a casting rod, and which facilitates reeling of the line off from and back onto the casting reel while the line extends through the line guides on the rod.

A more detailed object is to provide a reeling attachment of the above character in which the reel proper is journaled on an elongated support which projects substantially at right angles to and abuts at its end against the side of the casting rod to locate the plane of rotation of the drying reel in proper relation with respect to the tip of the casting rod.

Another object is to provide a mounting of the above character which permits the plane of rotation of the drying reel to be tilted manually back and forth across the casting rod tip to distribute the line evenly on the drying reel.

A further object is to clamp the drying reel to the casting rod detachably and in a novel manner.

A further object is to provide a drying reel having arms projecting from hubs which are held mechanically interlocked by the same means which applies the rod clamping force.

The invention also resides in the novel construction of the clamp and of the means for locking the reel arms in operative position.

Other objects and advantages of the invention will become apparent from the following detailed description taken in connection with the accompanying drawings, in which Figure 1 is a perspective view of a casting rod equipped with a drying reel embodying the novel features of the present invention.

Fig. 2 is a perspective view of the line drier collapsed for storage in a tackle box.

Fig. 3 is a perspective view illustrating the manner of collapsing the drying reel.

Fig. 4 is a fragmentary plan view of the drying reel mounted on a casting rod.

Fig. 5 is a longitudinal section taken along the axis of the reel.

Fig. 6 is a fragmentary perspective exploded view.

Fig. 7 is a fragmentary section taken along the line 7—7 of Fig. 5.

Fig. 8 is a fragmentary view of the reel hubs with the reel collapsed.

Figs. 9 and 10 are views similar to Fig. 4 showing modifications.

The improved line drying attachment is especially adapted for drying a line 10 after use thereof on a casting rod 11 having a reel 12 fixed on the rod near the handle 13, the line being led off through guides such as eyes 14 spaced along the rod to the tip 15 thereof. The drying attachment comprises generally an elongated support adapted, when one end thereof is held in abutment with the side of the casting rod 11, to project substantially at right angles to the rod and provide a journal that supports a reel for rotation substantially in the plane of the rod tip 15 about an axis 9 extending transversely of and intersecting the rod, preferably adjacent the handle 13. While the reel support may take various forms, it is shown in Figs. 1 to 4 and 9 as comprising an elongated bar in the form of a tube 16 turned down at one end to form a shoulder 18 and a journal 19 for the winding reel 17.

In the present instance, the reel proper comprises four spokes 20 of identical construction preferably formed from pieces of wire and having laterally projecting arms 21 whose ends 22 and 23 converge inwardly to a longer straight portion of the arm 24 which parallels the reel axis 9 and cooperates with the corresponding parts of the other spokes to form the reel proper. The inner ends of the oppositely projecting reel spokes are secured to hubs 25 which are disposed adjacent each other and are rotatable on the journal 19 of the bar 16, which journal projects through and slightly beyond the two hubs when one of the hubs abuts the shoulder 18. Preferably, the spokes 20 are bent intermediate their ends as at 26 so as to space the hubs 25 axially from the bends 22 of the reel and thereby provide greater overall axial compactness of the device when the reel is collapsed.

In the present instance, the hubs 25 comprise flat metal rings or washers, and the inner ends of the wire spokes 20 are straight and secured as by spot welding to the opposed or adjacent surfaces of the two hubs, the diametrically opposite spokes being welded to the same hub as shown in Fig. 6. Thus, the arms on each hub project in opposite directions so that when the two sets of spokes are relatively turned through a quarter revolution, the corresponding spokes 20 and the arms 21 of the different pairs lie side by side as shown in Fig. 8 thereby collapsing the entire device into a flat package (Fig. 2)

which may be carried in an ordinary tackle box.

The wire spokes 20 thus located between the hubs 25 serve to space the latter apart along the journal 19 and thus impart the desired axial length to the bearing defined by the walls of the hub apertures 27. The reel will thus run true on the journal 19 even though the hubs comprise relatively thin washers which fit relatively loosely on the journal. Such location of the wire ends in a common plane between the hubs enables all four of the reel spokes to be of the same construction thereby simplifying manufacture.

The inner portions 28 of the spokes 20 are utilized advantageously to perform still another function of locking the hubs positively against relative turning when the reel is extended with all four of the arms spaced apart uniform angular distances, that is substantially at right angles. For this purpose, the ends and sides of the spokes on the different hubs are arranged to provide opposed circumferentially facing surfaces which interlock with each other when the hubs are disposed close together but are adapted to swing past each other and permit folding of the spokes against each other after axial separation of the hubs.

To form these interfitting surfaces, the ends 28 secured to each hub are extended along parallel chords of the hub from opposite sides thereof but only partially across the hub. Thus, the two end portions 28 are disposed on opposite sides of the hub hole 27 with their extreme ends 29 projecting only slightly beyond the hole 27. Now, when the two hubs are placed together with the spokes 20 disposed at right angles, the end portions 28 on the two hubs will interfit as shown in Fig. 7 with the end portion 28 on each hub extending across the end 29 of the portion on the other hub and abutting the side of the other end portion 28 on the latter hub thus preventing relative turning of the hubs in either direction.

Although the hubs are thus locked positively against relative rotation, they may be unlocked and turned to collapse the reel simply by separating the hubs 25 axially or by twisting of the spokes as shown in Fig. 3. Then, the hubs may be turned angularly relative to each other to bring the corresponding arms of the two hubs into parallelism as shown in Fig. 2, the reel then being collapsed with the inner ends of spokes on the different hubs coinciding with each other as shown in Fig. 8.

To locate the reel on the casting rod 11 close to the latter and with the reel axis 9 substantially at right angles to and intersecting the rod, the end of the bar or tube 16 opposite the reel is adapted to abut against the side of the rod. For this purpose, an abutment 30 is fixed to the tube and projects laterally from the tube end so as to be disposed substantially at right angles to the reel axis 9. Herein, this abutment is formed by one projecting side of a washer 33 pressed onto a shoulder on the tube end and covered with a layer 32 of somewhat yieldable material such as rubber so as to avoid marring of the finish on the casting rod 11. The abutment 30 is spaced from the drying reel so that the bends 22 in the reel arms will clear the casting rod as the reel is rotated with the abutment positioned against the side of the rod 11.

In the present instance, provision is also made for clamping the abutment 30 detachably against the rod so that the drying reel will be supported by the rod during and after winding of the line thereon. To this end, the abutment 30 coacts with an opposed jaw 31 which is supported on the tube and is movable axially of the latter toward and away from the abutment or jaw 30. While the jaw 31 may take various forms and be secured to the reel support in various ways, it is formed in the present instance by a tube 62 of relatively firm rubber snugly encircling the bent up end portion 33ª of a rod 34 which projects loosely through the tube 16 and is slidable axially therein. Preferably, the end 33ª is bent through slightly more than a right angle so that the outer portion overlies the rod 11 slightly as shown in Fig. 5 when the rod of the largest size to be accommodated is clamped between the jaws 30 and 31. The tubing 62 extends around the bend in the rod 34 so as to underlie and protect the clamped casting rod.

Means is provided on the reel support for moving the jaws 30 and 31 toward and away from each other to clamp and release a casting rod of any desired size disposed between the jaws. Preferably, this means comprises a resiliently extensible and contractible element such as a compression spring 35 coiled around the axis 9 and acting against an abutment 36 on the one of the relatively slidable supporting members which carries the movable clamping jaw 31. In the form shown in Figs. 1 to 5, this abutment is defined by a nut 37 threaded onto the end portion of the rod 34 which projects through the tube 16 and beyond the journal end thereof a distance equal to the axial length of the spring 35 when the latter is stressed sufficiently to produce the required clamping force. The spring encircles the threaded end of the rod 34 and bears at its other end against a washer 38 which abuts against the end of the journal 19 and lies close to the outer reel hub 25. Thus, the spring, acting on the nut 37 and through the rod 34, draws the jaw 31 toward the jaw 30. To separate the jaws and permit insertion of the casting rod between them, it is only necessary to press the nut inwardly against the force of the spring. When the nut is again released with the rod disposed between the jaws, the latter are drawn together by the spring, the support becoming attached to the rod automatically with the drying reel located in the proper position relative to the rod tip 15. By employing the removable nut 37, assembly of the parts is facilitated.

In accordance with another aspect of the present invention, the same force which draws the jaws 30 and 31 together to clamp the rod 11 also holds the interlocked reel hubs 25 against axial separation thereby preventing collapse of the drying reel after winding of the line 10 thereon. This is accomplished in the preferred form by locating one of the spring abutments, in this instance the washer 38, at the end of the journal 19 so that separation of the reel hubs 25 to unlock them may be effected only by overcoming the spring and moving the abutment 38. Thus, in the normal use of the reel (Fig. 1), the spring 35 acts to hold the reel hubs together against accidental disengagement of the interlocked surfaces 28 and 29.

Provision is made for permitting a limited degree of tilting of the plane of rotation of the reel back and forth across the pole tip 15 so that a line being wound onto the reel may, during the winding operation, be distributed across the full axial length of the reel parts 21 thereby facilitating quick drying of the reeled line. This is accomplished in the present instance by rendering the surface of at least one of the clamping jaws 30 and 31 yieldable as, in the preferred embodiment, by actuating the movable jaws by a resilient means such as the spring 35. Or, as in the form shown in Fig. 10, resiliency of one or both of the rubber coverings 48 and 62 may be relied on to provide the necessary yieldability. Such tilting of the reel is facilitated by making the surface of one of the jaws, in this instance the jaw 31, narrower than the other.

Tilting of the reel back and forth between the positions shown in full in dotted lines in Fig. 4 may be effected by applying a laterally directed force to the reel support 16. To accomplish this most conveniently, one or more lateral projections 40 are made rigid with the tube 16 at a point spaced about midway between the clamp and the reel. Two such projections are provided in the present instance by extending a bar across the side of the tube 16 and welding the center of the bar rigidly to the tube. The bar ends may be engaged easily by the fore and middle fingers 41 and 42 of the user's hand encircling the casting rod 11 adjacent the clamps, the fingers straddling the tube as shown in Fig. 1. By applying manual pressure alternately to opposite ends of the bar 40 as the reel is being turned, the reel may be tilted back and forth as desired to spread the line across the reel. The pressure applied to the bar 40 also assists the clamp in holding the abutment 30 of the reel support in proper position against the side of the rod 11. In addition, the rod 40 affords a convenient abutment for engaging and holding the reel support while the clamping jaws are being opened by thumb pressure applied to the nut 37 to compress the spring 35.

The reeling device above described may, when collapsed as shown in Fig. 2, be prepared for use simply by swinging the reel spokes apart whereupon the inner spoke ends 28 will, under the action of the spring 35, snap automatically into interlocked position (Fig. 7) when the spokes become disposed at right angles to each other. By engaging the projections 40 with the fore and middle fingers of one hand and pressing inwardly on the nut 37 with the thumb of that hand, the spring 35 may be compressed and the rod slid through the tube 16 to separate the jaw 31 from the jaw 30. The jaw 31 is then hooked around the casting rod at a point spaced a short distance above the handle and the spring released whereupon the jaws are urged together to grip the rod and hold the reel supported thereon. The reel should be disposed on the side of the rod 11 opposite the reel.

Next, the end of the line led from the pole tip 15 is looped over or fastened to one of the reel arms 21 as indicated at 49 (Fig. 1) after which the reel is turned by the fore finger 44 placed against one of the reel spokes 20 as shown in Fig. 1. Preferably, the other hand encircles the rod 11 adjacent the clamp with the fore and middle fingers 41 and 42 straddling the tube 16 and bearing against opposite ends of the crossbar 40. By drawing either one of the bar ends toward the rod 11, the reel may be tilted as desired as permitted by yielding of the clamping jaws so that the plane of rotation of any axial part of the reel may be made to coincide with the pole tip 15. In this way, the position of the line being wound may be shifted back and forth across the reel arms 21 and the line thus distributed to facilitate rapid drying.

The reel with the line wound thereon may be left attached to the rod 11 during drying of the line. To rewind the line back onto the casting reel, it is only necessary to turn the crank thereof thereby unwinding the line from the drying reel and drawing the same back through the rod guides 14. After this, the clamp may be released by pressing the nut 37 inwardly. To collapse the drying reel, the hubs 25 are separated slightly as by twisting the spoke arms as shown in Fig. 3. The separation need only be sufficient to allow one part of a spoke end 28 to pass another after which the ends 28 will act as cams to spread the hubs as the spokes are swung together.

In the modification shown in Fig. 9, the spring 35 is, for the sake of compactness, located on the other or inner side of the reel hubs 25. As before, one end bears against a washer 45 to urge the reel hubs toward an abutment 46 on the outer end of the rod 34. In this instance, the jaw 31 is movable by making the tube 16 relatively short so that its inner end abuts against the other spring end approximately at the position of the crossbar 40. The operation of this form is the same as in the case of the form first described.

Instead of using a spring, the clamping jaws may be actuated positively as shown in Fig. 10. For this purpose, the nut 37 bears directly against the washer 38 so that the movable jaw 31 is actuated by screwing the nut in and out on the threaded end of the rod 34. The force with which the jaws grip the rod may then be adjusted by tightening or loosening the nut. In this form, the yieldability of the rubber jaw facings permits of the desired lateral tilting of the reel support. If desired, the fixed jaw 30 may, as shown, be formed from a U-shaped piece of wire straddling and welded to the end of the tube 16 with a piece of rubber tubing 48 slipped over each of its projecting legs 49.

This application is a continuation-in-part of application Serial No. 697,214, filed September 16, 1946, now abandoned.

We claim as our invention:

1. A rotary line drier comprising a bar having a journal on one end portion terminating in a shoulder spaced from the bar end, clamping means associated with the other end of the bar, a threaded member mounted on said bar for endwise movement along the axis of said journal to actuate said clamping means, a reel comprising hubs and spokes projecting therefrom in angularly spaced relation, means including said spokes on said hubs interlocking with each other to hold said spokes angularly spaced when said hubs are pressed axially toward each other, said means being disengageable to permit relative turning of the hubs after axial separation thereof, the end of said bar projecting through said hubs when the latter are pressed together, a nut threaded onto said member and providing an adjustable abutment spaced from said hubs, and a spring coiled about said member and acting in compression between one of said hubs and said abutment.

2. A rotary line drier comprising a bar, clamping means carried by one end of said bar and adapted to grip a casting rod to support the bar substantially perpendicular to the rod, a circumferentially collapsible reel journaled on the other end of said bar and having two hubs adapted to interlock in one angular position but adapted when separated axially to turn relative to each other and collapse the reel, and a bolt having a nut thereon and an abutment acting against said bar and when the nut is tightened to actuate said clamping means and hold said hubs on the bar end.

3. A rotary line drier comprising, an elongated support, clamping means carried by one end of said support including two relatively movable jaws adapted to grip a casting rod on opposite sides thereof and locate the support substantially perpendicular to the rod, a circumferentially collapsible reel journaled on the support and axially spaced from the clamping means, said reel having two hubs adapted to interlock in one angular position but adapted when separated axially to turn relative to each other and collapse the reel, and a spring acting in compression between one of said reel hubs and an abutment on said support to hold said hubs against axial separation and tighten said clamping means while permitting yieldable separation of said clamping jaws in response to a force applied to said support in a direction to tilt the latter and said reel laterally, and a member rigid with and projecting laterally from said support at a point between said hubs and said clamping means and manually engageable to facilitate tilting of said support relative to the rod to which it is clamped.

4. A rotary line drier comprising, an elongated support, clamping means carried by one end of said support including two relatively movable jaws adapted to abut against and grip a casting rod with the support substantially perpendicular to the rod, a circumferentially collapsible reel journaled on the support and axially spaced from the clamping means, said reel having two hubs adapted to interlock in one angular position but adapted when separated axially to turn relative to each other and collapse the reel, and a spring coiled around the rotational axis of said reel and acting in compression between one of said reel hubs and an abutment on said support to hold said hubs against axial separation and tighten said clamping means while permitting yieldable separation of said jaws in response to a force applied to said support in a direction to tilt the latter and said reel laterally.

5. A rotary line drier comprising an elongated supporting member having a laterally projecting clamping jaw at one end, a second member slidable axially on said first member and having a laterally projecting jaw coacting with said first jaw, a reel axially spaced from said jaws and journaled on one of said members to turn about an axis extending generally perpendicular to the coacting faces of said jaws, a resiliently extensible and contractible element acting against said members along said axis to urge said jaws toward each other to grip a rod disposed between the jaws while yielding axially to permit bodily tilting of the rotational plane of the reel relative to the clamped rod, and a bar rigidly secured to and extending laterally from one of said members at a point between said jaws and said reel and manually engageable on opposite sides of the member to facilitate said tilting.

6. A rotary line drier comprising an elongated supporting member having a laterally projecting clamping jaw at one end, a second member slidable axially on said first member and having a laterally projecting jaw coacting with said first jaw, a reel axially spaced from said jaws and journaled on one of said members to turn about an axis extending generally perpendicular to the coacting faces of said jaws, and a resiliently extensible and contractible element acting against said members along said axis to urge said jaws toward each other to grip a rod disposed between the jaws while yielding axially to permit bodily tilting of the rotational plane of the reel relative to the clamped rod.

7. A rotary line drier comprising an elongated support, a reel journaled on said support to turn about an axis extending longitudinally thereof, two opposed clamping jaws extending transversely of said axis and mounted on said support for movement toward and away from each other to grip a rod disposed between the jaws and clamp the support to the rod with said axis disposed approximately perpendicular to the rod whereby to locate the plane of rotation of said reel close to said rod, and means on said support yieldably urging said jaws toward each other to produce the force for gripping the rod while permitting yieldable lateral tilting of said support relative to the rod.

8. A rotary line drier comprising an elongated support, a reel journaled on one end of said support to turn about an axis extending longitudinally thereof, an abutment rigid with said support at the other end thereof and extending laterally of said axis, said abutment being engageable with the side of a casting rod to locate the plane of rotation of the reel close to the rod, and a bar extending across said member and rigidly secured thereto at a point disposed between and spaced from said abutment and said reel with the opposite projecting ends of the bar engageable by the fore and middle fingers of the user's hand encircling said rod.

9. A rotary line drier comprising an elongated support, a reel journaled on one end of said support to turn about an axis extending longitudinally thereof, an abutment rigid with said support at the other end thereof and extending laterally of said axis, said abutment being engageable with the side of a casting rod to locate the plane of rotation of the reel close to the rod, and a member rigid with and projecting laterally from said support between said abutment and said reel, said member when said abutment is lying against the side of a casting rod, being manually engageable by the finger of a user's hand holding said rod and operable by movement of the finger toward and away from the rod to tilt said support and rock the plane of rotation of the reel back and forth across the tip of the casting rod.

10. A rotary line drier comprising an elongated supporting member having a laterally projecting clamping jaw at one end, a second member slidable axially on said first member and having a laterally projecting jaw coacting with said first jaw, a circumferentially collapsible reel axially spaced from said jaws and journaled on one of said members to turn about an axis extending longitudinally thereof, said reel having two hubs adapted to interlock in one angular position and be held against relative turning but adapted when separated axially to turn relative to each other and fold together, means on the other of said members providing an abutment facing axially toward said reel hubs, and a resiliently extensible and contractible element disposed between one of said reel hubs and said abutment and tending to separate the two in a direction to move said jaws toward each other and also urge said hubs toward each other to maintain interlocking thereof during rotation of said reel.

11. A rotary line drier comprising an elongated support, clamping means carried by one end of said support and adapted to grip a casting rod with the support substantially perpendicular to the rod, a circumferentially collapsible reel journaled on the support and axially spaced from the clamping means, said reel having two hubs adapted to interlock in one angular position but adapted when separated axially to turn relative to each other and collapse the reel, and a single means mounted on said support and movable relative thereto to tighten said clamping means and also to hold said hubs in interlocked position.

12. A rotary line drier comprising a supporting member, providing a journal, two rings rotatable on said journal and axially spaced apart, a pair of spokes projecting from diametrically opposite sides of one of said rings and secured to the inner surface thereof in spaced parallel relation and on opposite sides of said journal, a similar pair of outwardly projecting spokes secured to the inner surface of said other ring and interlocking with said first spokes when the first and second spokes are angularly spaced from each other whereby to lock the spokes in such angular relation, projections on the outer ends of said spokes forming a reel, and means for urging said rings into axially spaced relation determined by the thickness of said spokes but releasable to permit of sufficient axial separation to allow said first and second spokes to swing past each other and fold together whereby to collapse the reel.

13. A rotary line drier comprising a supporting member providing a journal, two hubs rotatable on said journal and axially spaced apart, two spokes projecting outwardly from opposite sides of one of said hubs and secured to the inner surface thereof, and two spokes similarly projecting from the other hub and secured to the inner surface thereof so as to lie in the same axial plane as said first spokes, the end of a spoke on one of said hubs abutting against the side of a spoke on the other hub to hold the hubs against relative turning when the hubs and spokes are held against axial separation.

14. A reel comprising two axially spaced hubs, and a pair of oppositely projecting spokes with straight inner end portions secured to the inner surface of each of said hubs and on opposite sides of the hole therein, each end portion on one of said hubs extending across the end of the end portion on the other hub and abutting at its end against the side of the second end portion on the latter hub when the spokes of the different hubs are angularly spaced apart.

15. A rotary line drier comprising a bar providing a journal, two hubs rotatable on said journal and axially spaced apart, two spokes projecting outwardly from opposite sides of one of said hubs and secured to the inner surface thereof, two spokes similarly projecting from the other hub and secured to the inner surface thereof so as to lie in the same axial plane as said first spokes, and means including said spokes on the respective hubs providing angularly facing opposed surfaces interlocking to hold said spokes angularly spaced but releasable upon axial separation of the hubs to permit relative turning of the hubs.

16. A reel comprising two hubs, and a pair of spokes on each hub rigidly secured to the surface of the hub and interfitting with the spokes on the other hub so as to lie in the plane thereof, said hubs being axially spaced apart according to the thickness of said spokes.

17. A reel comprising two hubs, and a pair of spokes on each hub secured to the surface of the hub to interfit with and engage at their ends with the sides of the spokes of the other hub to hold the hubs against relative turning in either direction.

18. A rotary line drier comprising an elongated support, a reel journaled on one end of said support, a clamping jaw rigid with and projecting laterally from the other end of said support and having substantial width for abutment with the side of a casting rod, a second clamping jaw of narrower width than said first jaw mounted on said support for movement toward and away from the first jaw, and means for pressing the surfaces of said jaws yieldably against opposite sides of a rod disposed between the jaws whereby to permit yielding of said surfaces and rocking of the plane of rotation of the reel in response to a laterally directed force applied to said support.

ALBERT K. PETERSON.
HONORE C. HUBBARD.

REFERENCES CITED

The following references are of record in the file of this patent:

UNITED STATES PATENTS

| Number | Name | Date |
| --- | --- | --- |
| 221,395 | Cass | Nov. 11, 1879 |
| 351,593 | Hand | Oct. 26, 1886 |
| 967,734 | Darrow | Aug. 16, 1910 |
| 1,286,085 | Peters | Nov. 26, 1918 |
| 1,913,632 | Green | June 13, 1933 |
| 2,214,661 | Darling | Sept. 10, 1940 |

FOREIGN PATENTS

| Number | Country | Date |
| --- | --- | --- |
| 20,681 | Great Britain | Nov. 27, 1891 |